P. PUTNAM.
Changeable-Gage Axle.
No. 97,552.
Patented Dec 7, 1869.
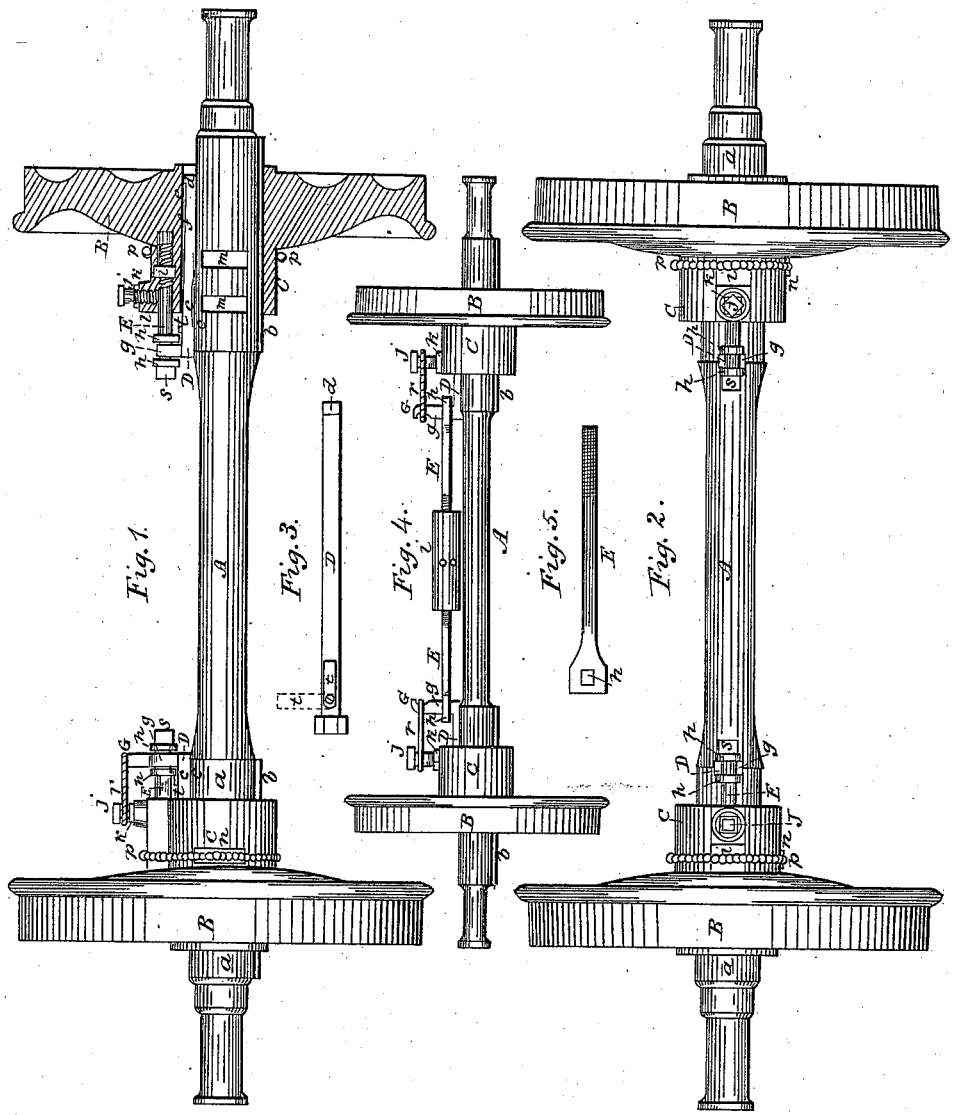

United States Patent Office.

PERLEY PUTNAM, OF LACONIA, NEW HAMPSHIRE.

Letters Patent No. 97,552, dated December 7, 1869.

IMPROVED RAILWAY-CAR WHEEL AND AXLE.

The Schedule referred to in these Letters Patent and making part of the same.

*To all whom it may concern:*

Be it known that I, PERLEY PUTNAM, of Laconia, in the county of Belknap, and State of New Hampshire, have invented Improvements in Adjusting and Securing Car-Wheels upon their Axles; and I do hereby declare that the following is a full and exact description thereof, reference being had to the accompanying drawings, making part of this specification—

Figure 1 being a side view of a car-axle, with a pair of wheels adjustable thereon, as provided by my improvements, one of the wheels being in central section.

Figure 2, a side view of the same, at right angles to the view in fig. 1.

Figure 3, a view of a part detached.

Figure 4, a view corresponding with fig. 1, showing a modification of the main improvement.

Figure 5, a view of one of the parts thereof, detached.

Like letters designate corresponding parts in all of the figures.

Let A represent a car-axle;

B B, the car-wheels thereon;

*a a*, the portions of the axle on which the wheels slide in adjusting; and

*b b*, projecting vanes on the axle, to fit in grooves in the eyes of the wheels, and prevent their turning on the axle.

In adjusting car-wheels upon their axles for different gauges of railroads, one mode of securing the wheels in position on the axles consists in a block, *n*, inserted and fitted in a mortise or cavity in the extended hub C of each wheel, and held into a transverse notch or groove, *m*, (fig. 1,) in the axle, by a spiral spring or elastic band, *p*, surrounding the hub and pressing into a groove in the projecting end of the said block.

There are different notches *m m* in the axle, to hold the wheels in precisely the proper positions for the different gauges of railroads required. But since it is necessary that the wheels, when unfastened, should slide freely on the axle, in order to adjust them readily, in addition to the method of fastening above described, or any equivalent fixed fastening, some means is necessary to tighten the wheels in place, and keep them from jarring and playing on the axle, but to be capable of being quickly and certainly loosened at any time.

The main feature of my invention consists in the employment of a spline, D, to be driven into adjacent grooves in the axle and eye of the wheel, so as to tighten the wheel on the axle by wedge-action, in combination with a screw, E, applied thereto, for forcing it into place and drawing it out, substantially as herein specified.

The splines are driven into the eyes of the wheels from the inside, and each one has a head, *g*, projecting outward, with a notch therein, into which the screw E fits, as in a fork.

The screw has two enlarged portions or flanges *h h*, one on each side of the head of the spline, so that it cannot move endwise in the spline-head, but, as it turns, must move the spline, either way, with it.

The screw enters the hub C of the wheel, and turns in a removable nut, *i*, sunk into a mortise or recess in the side of the hub, so that it can be replaced, if the screw wears loose therein. But the construction and arrangement of the screw, as described, may be varied.

A suitable square or equivalent head, *s*, is formed on the end of the screw, to turn it by.

This screw, thus arranged, serves not only to force the spline in and withdraw it, but also remains in place, to hold the spline tight in the wheel, and as additional means of security, the screw itself is held by another screw, *j*, screwed into the side of the hub, and pressing upon the side of the said screw E, the tightening-screw *j* being also secured by a binding-nut, *k*, screwed down upon the hub.

Then, as a further means of security, if all the foregoing fail, a spring-band, *r*, (shown in fig. 1, on the left wheel,) passes around the screw *j*, or some projection on the hub C, and around a hook, G, or its equivalent, projecting from the spline, so as to keep the spline drawn in by its elasticity.

Should all of the above alternative means of security ever fail, I provide against the losing out of the spline by forming a screw-head, *d*, (fig. 1, at the right,) on the outer or small end of the spline, projecting outward from the axle, and fitting in an enlargement, *e*, of the groove in the eye of the wheel.

This enlargement of the groove reaches far enough into the wheel to allow the spline to be drawn out sufficiently for completely loosening it in the wheel, and terminates in an abrupt shoulder, *f*, which prevents further withdrawal of the spline.

This head also prevents the accidental throwing out of the spline in the act of releasing, to change the gauge of the wheels.

On the outside of the spline, between its head *g* and the hub C of the wheel, is secured by a pivot, near one end, an eccentric stop-block, *t*, so formed and arranged that, when turned lengthwise of the spline, (as shown in fig. 3,) after the latter is drawn out, it will bear against the hub of the wheel, and prevent the spline from being driven in.

This block is to be brought into use when adjusting the wheel inward to a narrower gauge, so that the wheel may be moved along the axle without sliding over the spline and wedging thereon, before it is brought into position.

When the use of the stop-block is not required, it is turned aside, as shown by dotted lines in fig. 3.

Instead of this eccentric block, a spring-stop may be used, so arranged that it can bear against the hub, when required, or can be sprung into a groove or recess, either in the spline or in the wheel-hub, when the spline is to be driven into place.

The modification shown in fig. 4 consists in employing the screws E E for both splines of a pair of wheels together, they reaching inward toward each other, and entering a long nut, $i$.

The screw-threads on the two screws are, respectively, right and left, so that, by turning the nut one way, the screws will both be driven outward, and by turning the nut the other way, the screws will both be forced inward.

The heads $s\ s$ of the screws have sockets $h\ h$, which fit over the heads $g\ g$ of the splines, and thus prevent the screws from turning.

Variations from this construction of the screws may be adopted.

By this modified arrangement both splines are drawn out or inserted at one operation, so that operating is more expeditious.

If one spline starts out first, the small head $d$ thereof, striking the shoulder $f$, holds the spline for the screws to draw on, till the other spline is loosened.

The screws are then taken off, not being used to retain the splines in place, but, instead, the tightening-screw $j$ bears directly upon the spline, or into a depression in its surface.

The spring-band $r$ is used the same as shown in fig. 1, and above described.

What I claim as my invention, and desire to secure by Letters Patent, is—

The splines D D and operating-screws E E, applied to and in combination with the axle A and wheels B B, substantially as and for the purpose herein specified.

Also, the head $d$ on the small end of each spline, in connection with the recess $e$ and shoulder $f$ in the wheel, for the purpose set forth.

Also, the eccentric or spring-stop $t$ on the spline, constructed and arranged, in connection with the wheel-hub, substantially as and for the purpose herein specified.

Also, the spring-band $r$, in combination with the spline and wheel-hub, for the purpose herein set forth.

Specification signed by me, September 15, 1869.

PERLEY PUTNAM.

Witnesses:
JOHN ALDRICH,
C. P. S. WARDWELL.